Figure 1:
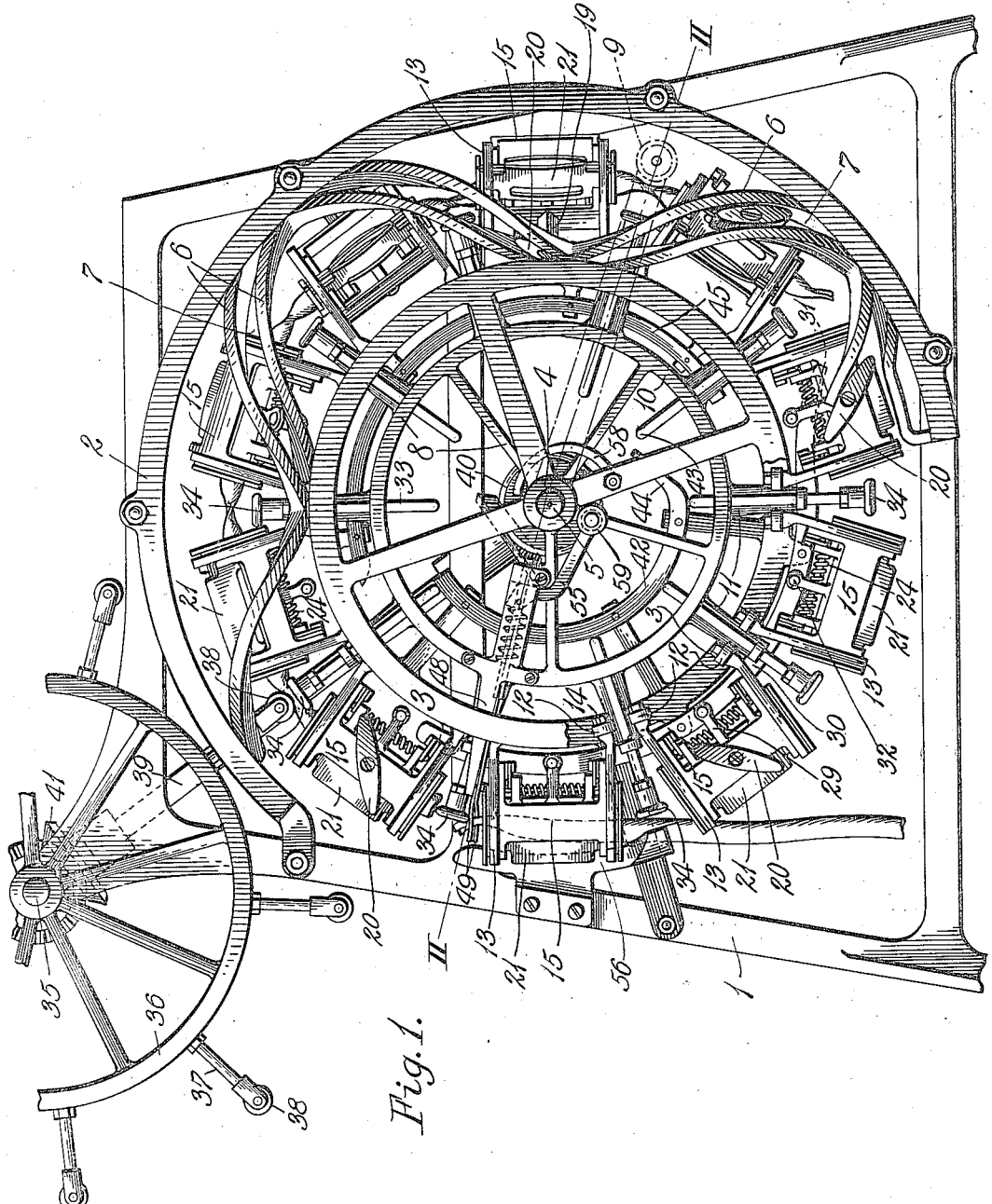

J. SHIER.
SAUSAGE LINKING MACHINE.
APPLICATION FILED DEC. 26, 1912.

1,075,604.

Patented Oct. 14, 1913.

3 SHEETS—SHEET 1.

Witnesses
Chas W. Stauffiger
Anna M. Dorr.

Inventor
John Shier,
By
Attorneys

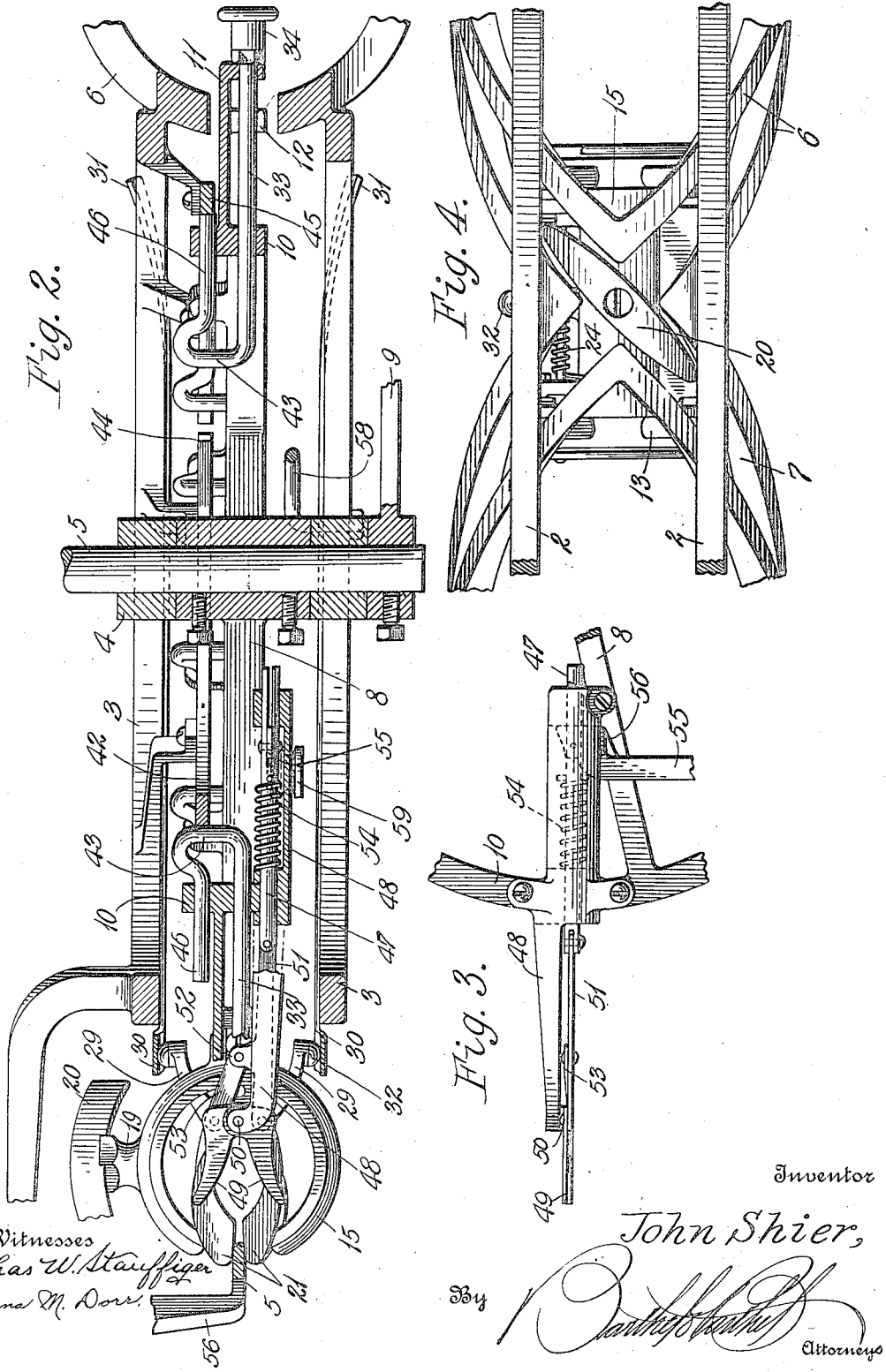
J. SHIER.
SAUSAGE LINKING MACHINE.
APPLICATION FILED DEC. 26, 1912.
1,075,604.
Patented Oct. 14, 1913.
3 SHEETS—SHEET 2.
Inventor
John Shier,
By
Attorneys J. SHIER.
SAUSAGE LINKING MACHINE.
APPLICATION FILED DEC. 26, 1912.
1,075,604.
Patented Oct. 14, 1913.
3 SHEETS—SHEET 3.
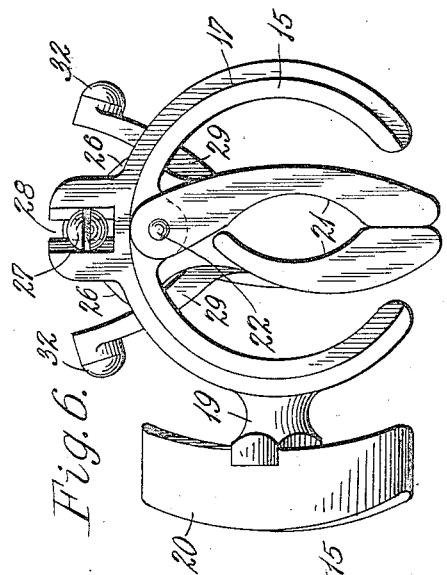
Fig. 6.
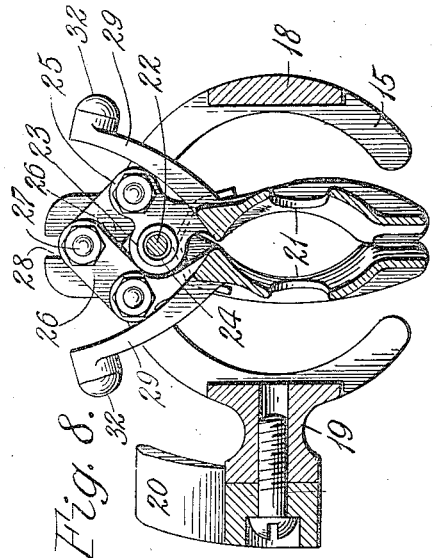
Fig. 8.
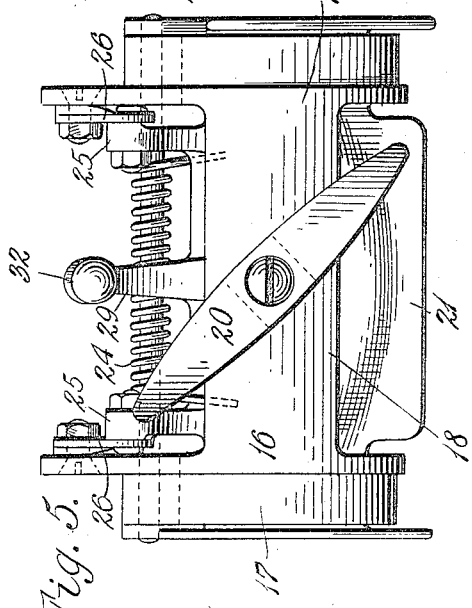
Fig. 5.
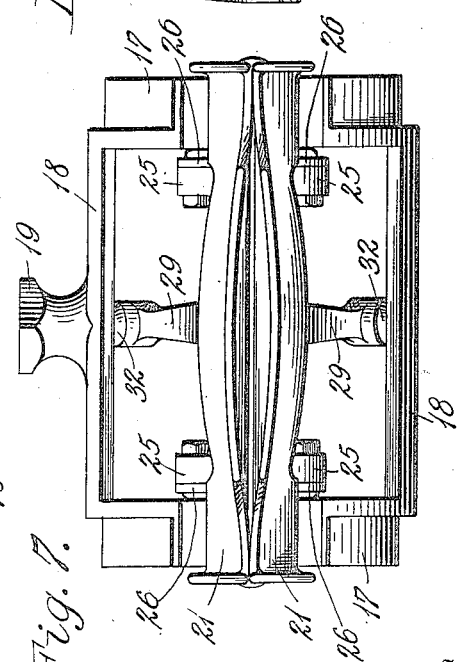
Fig. 7.
Witnesses
Chas. W. Stauffiger
Anna M. Dow
Inventor
John Shier,
By 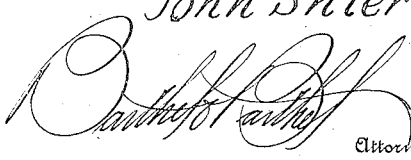
Attorneys

UNITED STATES PATENT OFFICE.

JOHN SHIER, OF DETROIT, MICHIGAN, ASSIGNOR OF ONE-THIRD TO CRYSTAL S. WRIGHT, OF DETROIT, MICHIGAN, AND ONE-THIRD TO CHARLOTTE BUTTON, OF MANSFIELD, OHIO.

SAUSAGE-LINKING MACHINE.

1,075,604.

Specification of Letters Patent.  Patented Oct. 14, 1913.

Application filed December 26, 1912. Serial No. 738,549.

*To all whom it may concern:*

Be it known that I, JOHN SHIER, a citizen of the United States of America, residing at Detroit, in the county of Wayne and State of Michigan, have invented certain new and useful Improvements in Sausage-Linking Machines, of which the following is a specification, reference being had therein to the accompanying drawings.

This invention relates to a machine for forming and twisting sausage links and its object is to provide a machine for the purpose which may be readily and continuously operated without danger of breaking the sausage casings, and which is simple and compact in construction.

It is also an object of the invention to provide certain other new and useful features, all as hereinafter more fully described.

To these ends the invention consists in providing a suitable carrier with a plurality of clamping devices which coöperate with link forming means to receive and twist each link, provision being made for giving a slack in the casings to allow for twisting, and the invention further consists in other matters hereinafter more fully set forth and pointed out in the claims, reference being had to the accompanying drawings, in which—

Figure 1 is a side elevation of a machine embodying the invention; Fig. 2 is an enlarged transverse section substantially on the line II—II of Fig. 1, the frame and semi-circular members being omitted; Fig. 3 is an enlarged detail of a device for gripping the end of a casing to feed it into the machine; Fig. 4 is an enlarged plan view of a portion of the frame and guide grooves; Fig. 5 is a side elevation of a rotatable clamp; Fig. 6, an end view of the same; Fig. 7, an inverted plan view; and Fig. 8, a transverse section.

As shown in the drawings, 1 is a suitable supporting frame to which is rigidly secured a track frame comprising two semi-circular members 2 and a pair of inner ring members 3 which have radial spokes connecting each with a center hub 4 forming bearings for a drive shaft 5. The rings 2 and 3 of the track frame are connected by parallel bars 6 formed integral therewith or otherwise secured thereto, to connect the rings and these bars are suitably curved and accurately spaced apart to form between them two spiral ways or grooves 7 extending substantially one-half of the distance around the periphery of the rings, one of said ways extending spirally in a direction opposite to that of the other and said ways intersecting each other at the inner and outer sides of the track frame. Secured upon the shaft 5 to turn therewith is a carrier wheel 8 which is rotated by turning the shaft 5 by means of a crank 9 secured upon the end of the shaft. The rim 10 of this carrier wheel is formed with a series of outwardly extending arms 11, and each post is formed with laterally extending lugs 12 having openings to receive the screwthreaded ends of laterally extending lugs on bearing rings 13 which are held in place by nuts 14 on the inner ends of the lugs engaging the inner sides of the ears 12. These bearing rings 13 are arranged in pairs between adjacent lugs 11 and each pair of rings forms a support for a rotatable carrier member 15, one of which members is shown in detail in Figs. 5 to 8 inclusive.

Each of the carrier members 15 comprises a suitable frame 16 which is in its general form, semi-cylindrical, it being open at one side and provided with formed end portions 17 to fit within the bearing rings 13 and adapted to turn freely therein. The formed semi-cylindrical end portions 17 of the frame are connected by two side bars 18, and one of these bars is formed with an outwardly extending stud 19 to which is pivotally attached a guide member 20 of a width to fit loosely within the spiral guide grooves 7. This guide member is extended in length and formed tapering toward each end so that it will slide freely along the ways or grooves 7 and will not catch or bind therein at the places of intersection of the two spiral ways. When the carrier wheel is rotated and the several members thus propelled through the annular frame of which the spiral ways form a part, the guide members 20 are brought into engagement with the guide ways and by their engagement therewith, will rotate each carrier member upon its axis within its bearing rings.

Each carrier member is provided with clamping means for engaging one of the sausage links and firmly holding the same while the carrier is being turned to twist the casing. Each of these clamps comprises two jaws 21 which are formed at their adjacent sides to conform somewhat to the shape of the sausage link, and these jaws are pivotally attached to the carrier member by means of a rod 22 engaging suitable openings in ears 23 on the upper ends of the jaws. The jaws are yieldingly held turned toward each other to clamp a sausage link between them, by means of coiled springs 24 sleeved upon the rod 22 with its ends engaging the jaws. To hold these jaws centrally within the carrier frame and cause them to open equally toward the sides of the frames so that a sausage link may be inserted therein through the open side of the carrier, each jaw is provided with a laterally extending ear 25 to which one end of a link 26 is pivoted. The opposite ends of these links are pivotally connected by a bolt 27 which is guided in a slot 28 in an upwardly extending portion of the frame of the carrier. The jaws are preferably connected near each end by a pair of links.

To open the jaws 21 against the action of the coiled springs 24, each jaw is formed intermediate its ends with a laterally and upwardly extending arm 29, and to the rings 3 of the annular frame are secured two guide strips 30 which are spaced apart and turned outwardly away from each other at one end, as shown at 31 in Fig. 2, to receive between them the contact ends 32 of the arms 29, which, as the rotatable carrier is revolved, will force said arms toward each other and swing the jaws upon their pivots, thus opening them and holding them open throughout the length of the contact strips 30 which extend from adjacent to one end of the spiral grooves 7, around the carrier to a point adjacent to the opposite end of said grooves, so that the jaws of the several carriers are held open during the time that the carriers are not being turned to twist the casings.

The outwardly extending posts or arms 11 on the carrier wheel 8 which form the supports for the carrier members 15, are also each provided with bearings for a rod 33 which is adapted to move freely in its bearings radially of the carrier wheel. Each rod is provided at its outer end with a head 34 adapted to engage the inner side of a sausage casing between the adjacent ends of the several carrier members.

Mounted in a suitable bearing on the supporting frame 1, is a stub shaft 35, and on this shaft is secured a wheel 36 having radially extending arms 37 provided with rollers 38 on their outer ends. The wheel is so supported and positioned that as it is rotated in timed relation to the rotation of the carrier wheel by any suitable means, the arms 37 will be brought, one at a time, into opposed relation with the plungers 33 and the roller 38 on its outer end will come into engagement with the outer side of the sausage casing and pinch the casing between it and the head 34 on the opposed plunger. This squeezing of the stuffed sausage casing at a point between the adjacent ends of carrier members, separates the sausage into links and the wheel 36 is so positioned that this separation or dividing into links takes place just before the carrier members pass into engagement with the spiral grooves which operate to rotate them.

The separator wheel 36 may be driven in timed relation to the rotation of the carrier wheel 8 by means of a shaft 39 and beveled gears 40 and 41, as shown, or any other suitable means may be employed to transmit motion from the driving shaft 5 to the stub shaft 35.

To move the plungers 33 radially outward and rigidly hold them in that position to oppose the arms 37 and squeeze the casings for the purpose of separating the sausage into links, a curved track bar 42 is rigidly supported from the annular members 3 of the frame and engages the inner bent end portion 43 of each plunger rod 33. The track bar 42 is formed with an inwardly extending inclined end portion 44 positioned at such a point that, as the carrier wheel is turned and the carrier members are rotated by engagement with the spiral grooves, the plungers will come into contact with said end 44 and force the plungers radially outward, directly after the twisting of the casing has been completed by the rotation of the carrier members. This outward movement of the plungers will eject the finished product from the clamping jaws of the carrier members and the linked sausage will fall from the machine. Directly after each plunger 33 has been brought into opposed relation with one of the arms 37 to divide the sausage in its casing, the plunger passes from the end of the track bar 42 and falls radially inward in which position it is held until it reaches the end 44 of the track bar and the twisting has been completed, by a fixed track bar 45 rigidly secured on the frame in a position to engage the outwardly extending end 46 of the plunger rod which end is bent outwardly into parallelism with the main portion of the rod from its inner end portion 43. The several plungers are thus positively moved and held radially outward during substantially one-half of the revolution of the carrier wheel and are positively held at the inner end of their radial movement during substantially the other half of the revolution.

When moved outwardly, the heads of the plungers project slightly beyond the longitudinal axis of the several carrier members and their clamping jaws so that when the sausage casing is placed in the machine and clamped by the jaws of two or more of the carriers, it will be held by the plungers at a radial distance from the axis of rotation of the carrier wheel, which is greater than the radial distance of the longitudinal axes of the several carrier members from said axis of rotation. As soon as the links are clamped, the plungers move radially inward and permit the casing of the sausage to drop therewith inwardly into the axes of rotation of the carrier members, thus causing a slack in the casing between the adjacent ends of said members.

In inserting the sausage casing in the machine, it is necessary to provide means for holding the end of the casing until a plurality of the clamping jaws have gripped the casing to hold it and draw it into the machine as the carrier wheel is turned. To so grip and hold the end of the casing, the carrier wheel is provided with bearings for a radially extending rod 47, and a fixed arm 48 extends radially outward from the wheel adjacent to the rod to form a rigid support for a pair of blades 49 which are pivoted together and to the fixed arm by a pivot pin 50. One of the blades 49 is pivotally attached at a distance from the pivot 50, to a rod 51 which is jointedly connected to the outer end of the rod 47. The rod 51 has an ear 52 to which a link 53 is pivotally attached at one end, the opposite end of said link being pivotally connected to the other of the blades at a distance from its pivot 50. A coiled spring 54 is sleeved upon the rod 47 and acts to normally hold the rod moved radially inward and the jaws or blades 49 in open position. A lever 55 is pivotally attached to the rod 47 and is formed with a cam projection 56 to engage one of the bearings for the rod and move said rod against the action of the coiled spring when the lever is turned.

To start a casing into the machine, the operator will turn the carrier to bring the holding blades 49 to the lower left hand side of the machine where he may readily place the end of the casing between the blades. He will then throw the lever 55 upwardly to close the blades upon the end of the casing, which blades will grip and firmly hold the casing so that when the carrier wheel is turned, the casing will be drawn upwardly and enter the open sides of the carrier members between the jaws 21 which, at this side of the carrier are held in open position by means of the guide strips 30. To guide the casing into place between the jaws as it is drawn upwardly by the rotation of the carrier wheel, a finger 56 is secured to the frame 1 and extends in the path of movement of the carrier members to pass between the outer ends of the jaws.

When the carrier wheel has been turned so that the blades 49 which hold the end of the casing have passed the point where the twisting of the casing is completed, said end of the casing is released by the blades to permit the sausage links to fall out of the machine. The lever 55 is thrown to so open the blades and release the end of the casing, by means of a cam track 58 which is secured to a fixed part of the frame and is adapted to engage a roller 59 on the end of the lever to throw said lever outward at the proper point. The clamping engagement of the jaws of the several carriers which are operating to twist the casing, will hold the casing and draw it into the machine so that a casing of any length may be run through the machine, it passing into the carriers at one side of the carrier wheel and falling out of the carrier members at the opposite side or bottom in a finished state. It is only necessary to stop the operation to insert a new casing.

The operation of forming and twisting sausage links is made continuous by the arrangement of a series of carrier members which are moved to successively engage portions of the casing and carry the same forward, at the same time twisting the casing between the links. The arrangement of a plurality of carrier members upon the periphery of a carrier wheel, makes provision for a slack in the casing which is necessary in order to permit the casing to be twisted without breaking it. In this construction each link is firmly clamped and held during the operation, and thus liability of breaking the casing is obviated. The jaws 21 which clamp each link are preferably so formed as to provide for the expansion of the link therein without danger of breaking the casing and the plungers 33 not only serve to oppose the arms 37 and positively and accurately divide the sausage into links, but also serve to eject the links after they have been so formed and the casing properly twisted.

Obviously, many changes may be made in the form or arrangement of parts without departing from the spirit of my invention and I do not limit myself to the particular construction shown.

Having thus fully described my invention what I claim is:—

1. In a sausage linking machine, the combination of a plurality of holders for sausage links, means for rotating each holder upon its longitudinal axis, and carrying means for moving the holders longitudinally.

2. In a sausage linking machine, the combination of a plurality of holders, a rotatable carrier upon which said holders are carried, means for rotating said holders to twist the casing of the sausages between the links, said holders being arranged to permit the sausage casing to move toward the axis of the carrier and provide a slack in the casing between the holders.

3. In a sausage linking machine, the combination of a rotatable holder, a clamp carried by said holder to receive a sausage link, means for rotating said holder with said clamp thereon to twist the sausage casing, and means for moving the holder to carry the casing lengthwise.

4. In a sausage linking machine, the combination of a rotatable carrier wheel, a plurality of holders for sausage links carried by said wheel adjacent to its periphery, means for turning the wheel, and means for turning each holder during the rotation of the wheel to twist the sausage casing between the holders.

5. In a sausage linking machine, the combination of a carrier, a plurality of holders for sausage links carried by said carrier, means for moving the carrier, means for turning the holders to twist the sausage casing, and means for pinching the casing between the adjacent ends of the holders to divide the sausage into links.

6. In a sausage linking machine, the combination of a carrier, a series of clamps on the carrier to engage the sausage links, members on the carrier between the adjacent ends of the clamps to engage the inner side of the sausage casing, means to oppose said members and squeeze the casing between said means and the members, and means for actuating said last named means and the carrier in timed relation to each other.

7. In a sausage linking machine, the combination of a rotatable carrier, a series of carrier members carried by said carrier to engage sausage links, and turn the same to twist their casing between the links, a series of members on the carrier forming supports for the sausage casing between said carrier members and movable inwardly to permit said casing to move toward the center of the carrier and form a slack in the casing between said carrier members, and means for rotating the carrier and turning the carrier members.

8. In a sausage linking machine, the combination of a rotatable carrier, a series of rotatable carrier members carried by said carrier, a series of plungers on the carrier between the several carrier members to engage a sausage casing at its inner side carried by said members, means to oppose each of the plungers and squeeze the sausage casing between them, and means for turning the carrier and rotating the carrier members.

9. In a sausage linking machine, the combination of a carrier wheel, a series of spaced carrier members upon the periphery of said wheel each having an open outer side to receive a sausage casing, means for rotating one carrier member in one direction and the adjacent carrier members in an opposite direction, means for turning the carrier, and means for pinching the sausage casing between the carrier members to form sausage links.

10. In a sausage linking machine, the combination of a carrier, means for moving said carrier, a rotatable carrier member on the carrier, jaws carried by the carrier member to receive and clamp a sausage link between them, means for rotating the carrier member to twist the sausage casing, and means for actuating the jaws in timed relation to the movement of the carrier to open and close the same.

11. In a sausage linking machine, the combination of a carrier, means for actuating the carrier, a rotatable carrier member on the carrier adapted to receive and hold a sausage link, a stationary frame adjacent to the carrier having a spiral way, and means on the carrier member to engage said way and rotate the member during the movement of the carrier.

12. In a sausage linking machine, the combination of a rotatable carrier wheel, a series of spaced bearing members on the periphery of said wheel, a series of carrier members engaging and rotating within the bearing members, said carrier members being open at their outer sides, clamping jaws within and pivotally attached to the carrier members with their free ends opposite the open outer sides of said carrier members, spirally arranged ways adjacent to the periphery of the carrier wheel, and means on each carrier member to engage the ways and turn the said member during the rotation of the carrier wheel.

13. In a sausage linking machine, the combination of a rotatable carrier wheel, a series of spaced carrier members on the periphery of said wheel for engaging and holding sausage links, radially movable plungers on the carrier wheel between the carrier members to engage the inner side of a sausage casing, a rotatable member having a series of radially extending arms adapted to be brought one at a time into opposed relation with the plungers to squeeze the sausage casing between them, and means for rotating said member in timed relation to the rotation of the carrier wheel.

14. In a sausage linking machine, the combination of a rotatable carrier wheel, a series of clamping members carried upon the periphery of said wheel to engage sausage links, means for rotating said clamping members upon the carrier wheel, a series of radially movable plungers on the carrier member extending outwardly between the clamping members and a fixed track to engage and move the plungers when the carrier wheel is turned.

15. In a sausage linking machine, the combination of a rotatable carrier wheel, a series of clamping jaws carried by the periphery of said wheel to clamp sausage links between them, means for turning the jaws while in clamping engagement with the sausage links and to twist the sausage casing between the links, arms on the jaws for opening and closing the same, and stationary means to engage the arms and operate the jaws during the turning of the carrier wheel.

16. In a sausage linking machine, the combination of a rotatable carrier wheel, a series of carrier members on the periphery of said wheel, means for rotating the carrier members, means on the carrier wheel for engaging and holding the end of a sausage casing to cause the casing to be drawn into engagement with the carrier members when the carrier wheel is turned, and means for turning the carrier wheel.

17. In a sausage linking machine, the combination of a rotatable carrier wheel, a series of rotatable carrier members on the periphery of said wheel, a pair of clamping jaws carried by each carrier member to embrace sausage links, two spirally arranged ways adjacent to the periphery of the carrier wheel, the turns of one spiral way being in a direction opposite to those of the other way, means on the carrier members for engaging the ways, and means operating in timed relation to the turning of the carrier wheel to squeeze the sausage casing at a point between the adjacent ends of the carrier members.

18. In a sausage linking machine, the combination of a rotatable carrier wheel, spiral ways arranged adjacent to the periphery of said wheel and extending a portion of the way around said wheel, said spiral ways being arranged with their turns extending in opposite directions, a series of rotatable carrier members on the periphery of the carrier wheel, means on the carrier members to engage the ways, a series of radially extending plungers on the carrier wheel between the carrier members, a fixed track to engage the plungers and move the same outwardly, said track being arranged at the side of the carrier wheel opposite that at which the spiral ways are positioned, means positioned adjacent to one end of the spiral ways for opposing the plungers to clamp the sausage casing between them, and means for turning the carrier wheel.

19. In a sausage linking machine, the combination of a supporting frame, a semicircular track frame on the supporting frame provided with a pair of spiral ways with the turns of one way extending in a direction opposite to those of the other way and said ways intersecting each other, a rotatable carrier wheel with its periphery adjacent to the inner side of the track frame, a series of rotatable carrier members on the periphery of the carrier wheel, means on each carrier member to engage the ways, a pair of jaws carried by each carrier member, laterally and inwardly extending arms on the jaws, fixed guides on the frame to engage the arms and operate the jaws, a rotatable member having a series of arms, a series of radially extending plungers on the carrier wheel to oppose the arms, means for turning said rotatable member in timed relation to the rotation of the carrier wheel, and a fixed track member on the frame to engage and move the plungers.

20. In a sausage linking machine, the combination of a rotatable carrier wheel, a series of rotatable carrier members upon the periphery of said wheel, means for rotating the carrier members during a portion of each rotation of the carrier wheel, a pair of jaws secured by each carrier member to embrace sausage links, means for yieldingly holding the jaws in closed position, means for opening the jaws and holding the same in open position during a portion of each revolution of the carrier wheel, means for gripping the end of a sausage casing carried by the carrier wheel, means for automatically actuating said gripper to release the end of the casing at a predetermined point in the rotation of the carrier wheel, a series of plungers carried by the carrier wheel to engage the inner side of the sausage casing, means for moving said plungers radially and operating to hold the same at the outer end of their movement during a portion of each revolution of the carrier wheel, means actuated in timed relation to the rotation of the carrier wheel to oppose the plungers at a fixed point in the revolution of the carrier wheel, and means for turning the carrier wheel.

21. In a sausage linking machine, the combination of a carrier, means for moving the carrier, a rotatable carrier member on the carrier, means for rotating the carrier member, a pair of jaws pivotally attached and supported within the carrier member with the free ends of the jaws at one side of said member which side is open to receive a sausage casing, a pair of pivotally connected links pivotally attached to the jaws adjacent to their pivotal support on the carrier member, and means on the carrier member for guiding the pivot connecting said links to hold the jaws centrally within the carrier member.

In testimony whereof I affix my signature in presence of two witnesses.

JOHN SHIER.

Witnesses:
 LEWIS E. FLANDERS,
 ANNA M. DORR.